United States Patent [19]

De Villepoix et al.

[11] Patent Number: 5,653,450
[45] Date of Patent: Aug. 5, 1997

[54] ULTRA-FLEXIBLE GASKET WITH DOUBLE JACKET

[75] Inventors: Raymond De Villepoix, Donzère; Christian Rouaud, Bourg Saint Andeol, both of France

[73] Assignee: Commissariat a l'Energie Atomique, Paris, France

[21] Appl. No.: 586,384

[22] Filed: Jan. 16, 1996

[30] Foreign Application Priority Data

Jan. 18, 1995 [FR] France .................. 95 00509

[51] Int. Cl.$^6$ ........................... F16J 15/12
[52] U.S. Cl. ............ 277/164; 277/229; 285/910
[58] Field of Search .................. 277/164, 229, 277/230, 205, 236, 204, 207 A; 285/363, 368, 910, 917

[56] References Cited

U.S. PATENT DOCUMENTS

| | | | |
|---|---|---|---|
| 2,859,061 | 11/1958 | Reid | 277/229 |
| 4,188,037 | 2/1980 | Abbes et al. | 277/164 |
| 4,603,892 | 8/1986 | Abbes et al. | 277/236 |
| 4,832,353 | 5/1989 | Nicholson | 277/236 |
| 5,423,557 | 6/1995 | De Villipoix et al. | 277/164 |

FOREIGN PATENT DOCUMENTS

| | | | |
|---|---|---|---|
| 2692019 | 12/1993 | France . | |
| 9113953 | 1/1992 | Germany . | |
| 4300191 | 7/1994 | Germany | 277/236 |
| 1751558 | 7/1992 | U.S.S.R. | 277/236 |
| 690906 | 4/1953 | United Kingdom | 277/230 |
| 1437052 | 5/1976 | United Kingdom | 277/236 |

*Primary Examiner*—Scott Cummings
*Attorney, Agent, or Firm*—Pearne, Gordon, McCoy & Granger LLP

[57] ABSTRACT

A gasket able to ensure static imperviousness between two parts one being fixed with respect to the other and possibly having surface irregularities and forming a joint housing which is not easily accessible.

It generally has a flexible strip (2) formed by two elements (2I, 2E) each having one extremity (7I, 7E). The mechanical behavior of the gasket is ensured by a wire core (3), such a helical spring possibly surrounded by an internal casing (4). An external rigid casing formed of two portions (5E, 5I) advantageously completes this gasket while leaving the extremities (7E, 7I) free.

17 Claims, 2 Drawing Sheets

ULTRA-FLEXIBLE GASKET WITH DOUBLE JACKET

FIELD OF THE INVENTION

The invention concerns imperviousness between two volumes where different pressures and temperatures prevail and delimited by parts fixed with respect to one another. This gasket is used on turbo-propeller engines equipping civil and military aircraft, especially in places not easily accessible and whose maintenance proves to be a delicate operation because of lack of space or accessibility.

BACKGROUND OF THE INVENTION

Gaskets have been extensively used to separate two volumes containing different fluids at different pressures and temperatures, the parts delimiting these volumes being fixed with respect to one another. In certain turbo-propeller engines, this is the case with pressurization air circuits where the under-pressure hot air, taken from the engines and before it fulfills its function, circulates in confined spaces with difficult access. For these places, the operations for overhauling and maintenance can be extremely difficult to carry out owing to lack of space and/or difficulty for the operator to gain access. Moreover, because of these difficulties, this operator may, generally speaking, not be able to use a booster tool.

This type of joint ought to ensure a certain amount of imperviousness between two pipe elements with sealing to be effected with an extremely slight clamping. In addition, a variable crushing of the gasket may be obtained over several millimeters so that the approach, joining and locking of the pipe elements may be effected manually without having recourse to using special mechanical tools.

Moreover, it is essential to take account of the fact that crushing of the gasket may not be regular and change over a period of time when the device is being used. In fact, following differential thermal expansion of the pipes, variation of the joint on this perimeter may vary by several millimeters.

The French patent published under number 2 692 019 discloses a flexible joint with a jacket used on aircraft turbo-propeller engines. This gasket able to ensure static imperviousness between an internal medium and an external medium, and dynamic imperviousness between two portions of the internal medium.

It mainly comprises a central core in the form of a spring surrounded by three casings, the second of the latter being able to ensure dynamic imperviousness between the mobile and fixed elements. The external casing ensures static imperviousness between the two parts of the fixed elements.

The extremity of the jacket is slightly in contact with the mobile element and makes it possible for each medium to be in contact with the mobile element on both sides of the jacket.

By virtue of the flexible extremity of the jacket, this type of joint ensures dynamic imperviousness between one or several fixed parts and one or several static parts. It is not designed to be used to ensure static imperviousness in places with limited accessibility and where the mounting of a gasket proves to be a delicate operation.

The purpose of this invention is to resolve this drawback by offering a fully static gasket seal able to be mounted in places not accessible to a motor without having recourse to using special tools.

SUMMARY OF THE INVENTION

The main purpose of the invention is to produce a toric ultraflexible static gasket intended to ensure imperviousness between two media where different temperatures and pressures prevail, these media being both delimited by two walls separated by a space of a known width, the gasket comprising:

- at least one flexible strip of determined width and wider than the width of said space to be divided and closed to form a ring; and
- an external rigid casing surrounding and keeping the flexible strip in its central portion whilst leaving free the two imperviousness ends of the flexible strip so as to enable these two ends to deform when the gasket is being placed in the space by flattening or distancing of the impervious ends of said strip.

According to the invention, the flexible strip is formed of two distinct elements, one internal and one external, each having a central bulged portion to surround, each on their side, half of the first internal rigid casing and be joined together at their end so as to constitute two sealing ends of the strip intended to ensure imperviousness.

Thus, the difficulties for placing and any possible irregularities of the profile of walls of the volume to be divided may thus be compensated by flattening the ends of the flexible strip.

Preferably, the gasket has a ductile metallic core.

In a first embodiment, the ductile metallic core is preferably formed of a metallic spring.

A first internal metallic casing may possibly complete this embodiment and surround the ductile metallic core.

The external rigid casing is preferably formed of two elements, namely one internal element and one external element, each comprising each a bulged central portion, so as to be applied against the corresponding elements of the flexible strip.

According to a second embodiment, the joint has a metallic core formed of a solid, metallic and ductile retainer ring.

Preferably, an external and/or internal reinforcing piece is applied to the external casing.

BRIEF DESCRIPTION OF THE DRAWINGS

The invention, its various embodiments, advantages and all its technical characteristics shall be readily understood from a reading of the following description accompanied by the five figures respectively representing.

DETAILED DESCRIPTION OF THE PREFERRED EMBODIMENTS

Figure 1:
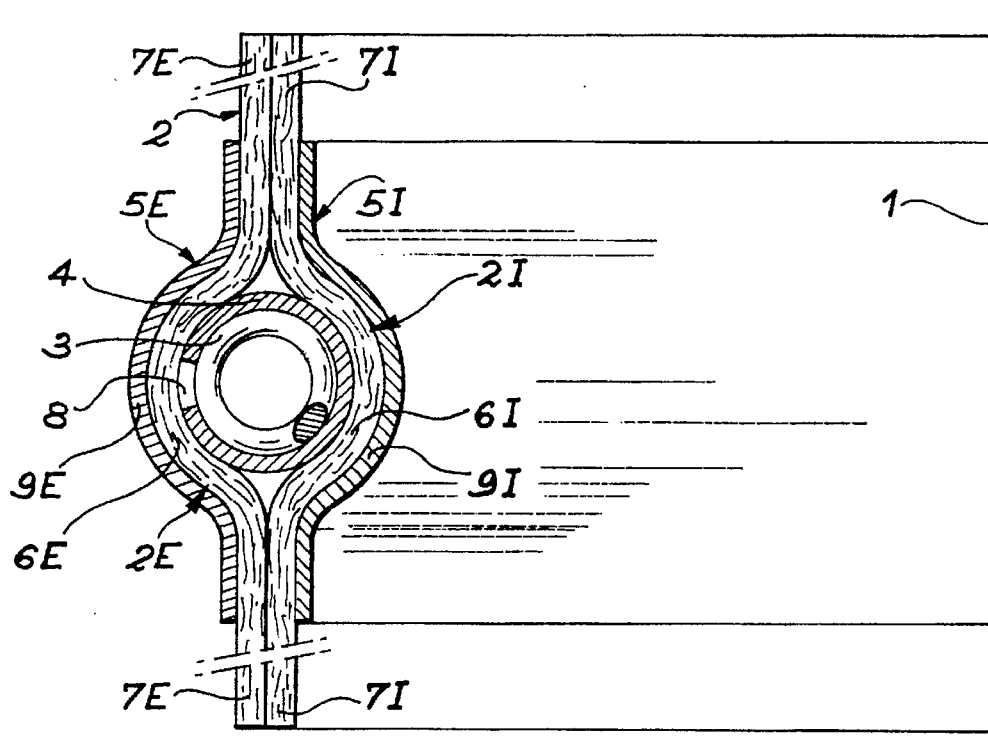
FIG. 1 is a sectional view of the gasket of the invention in its first embodiment.

With reference to FIG. 1 representing the first embodiment of the gasket, the gasket has two flexible strips, namely one internal flexible strip 2I and one external flexible strip 2E. These two flexible strips 2I and 2E are joined side by side to form a ring whose center is symbolized by the longitudinal axis 1 which is also the central axis of the joint. The respective ends 7I and 7E of said two flexible strips 2I and 2E join together, whereas their respective central portions 6I and 6E are moved aside and bulged. The two ends 7I and 7E of the flexible strips 2I and 2E extend parallel to the longitudinal axis of the joint 1. The main characteristic of the strip 2 formed as above is its flexibility and resistance to high temperatures. With this aim in mind, said flexible strip 2 may be formed of flexible metallic fibers, fabric or fine nettings, or in more generally fabric, fibers or felt made of a mineral or synthetic material.

This form is intended to contain a central metallic core 3 appearing, for example, in the form of a helical spring with contiguous spires. This metallic central core is therefore ductile and is used as a general frame for the joint.

In this embodiment, said core is surrounded by an internal casing 4, preferably metallic. The latter thus surrounds the core 3 so as to smooth out its irregularities and facilitate the joint warping operations. In addition, it can have an unclosed C-shaped section, thus leaving an opening 8 on the side.

The internal and external flexible strips 2I and 2E forming the flexible strip 2 thus encircling the unit constituted by the core 3 and the internal metallic casing 4. The bulged portions 6I and 6E thus surround the metallic casing 4.

A final element of the gasket is formed of an internally rigid external casing 5I and an externally rigid external casing 5E. These casings thus surround the internal 2I and external 2E flexible strips by a bulged central portion 9I and 9E. It is to be noted that the ends of these two internal and external casings 5I and 5E are shorter than the respective ends 7I and 7E of the flexible strips 2I and 2E so as to leave these ends free and enable their flexibility to be used to obtain the desired imperviousness.

The internal rigid casing 3 and the external rigid casing 5 are preferably metallic and comprise, more specifically, a currently-used metal able to be rolled, such as aluminium, silver, copper, nickel stainless steel or Inconel, which is able to resist service conditions.

Figure 2:
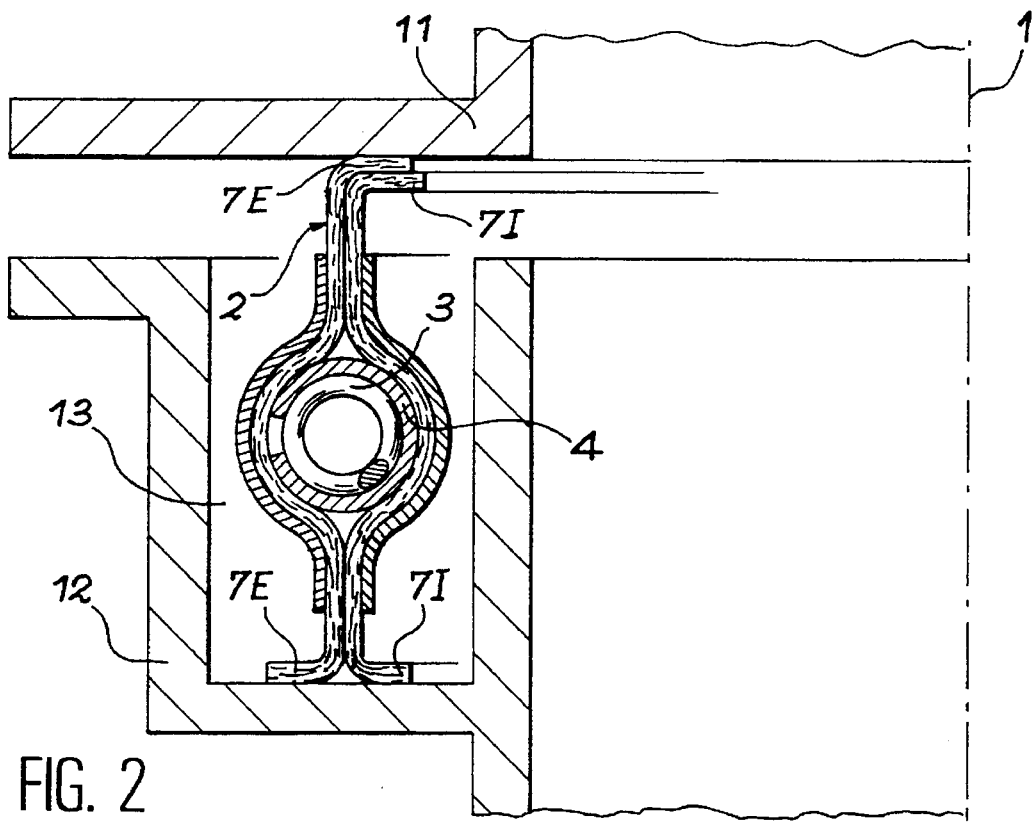
FIG. 2 is a sectional view of the gasket of the FIG. 1 installed between two parts within the context of its use.

With reference to FIG. 2, the latter shows how the gasket of the invention is disposed or placed in the housing 13 or the place where it needs to be installed. In fact, it is placed between two fixed parts 11 and 12 of the joint. The fixed part 12 forms a toric housing 13 in which the gasket is fully placed. Once the gasket is in place, these friction extremities, that is the internal 7I and external 7E imperviousness extremities, are bent back as the distance separating the walls of the first fixed part 11 from the bottom of the cavity 13 is shorter than the distance separating these imperviousness extremities 7E and 7I. The flexibility of the material used makes the above possible.

It may be observed that the upper extremities are both bent back in the same direction, that is towards the inside of the joint, whereas the lower extremities are each bent back in the opposite direction. This is an example of the deformation of the extremities.

The crushing of these extremities provides imperviousness between the inside of a pipe formed by the internal volumes of the fixed parts 11 and 12 and centered around the longitudinal axis 1 and outside this pipe. The joint is thus able to prevent a hot fluid under pressure from escaping from this pipe. Depending on the unevenness of the flanges of these two fixed parts 11 and 12 caused by differential expansion, the imperviousness extremities 7I and 7E of the joint are more or less crushed but are still in contact with the surfaces flange surfaces.

Figure 3:
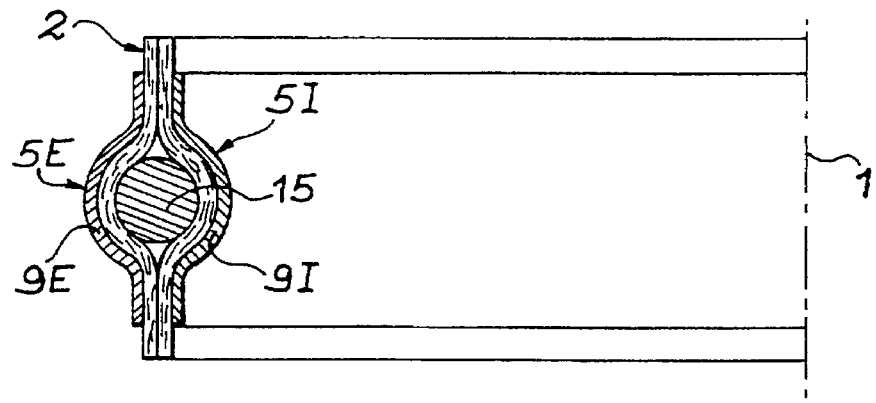
FIG. 3 is a sectional view of the gasket of the invention in its second embodiment.

With reference to FIG. 3, the gasket shown is a variant of the first gasket of the invention. It uses the same outer elements, that is a rigid external casing formed of two elements, an internal element 5I and an outer element 5E. On the other hand, the metallic core 3 and the internal casing 4 of the joint of FIG. 1 are replaced by a solid metallic core preferably constituted by a solid metallic retainer ring 15. This solution is preferably retained when the outer diameter of the bulged portions 9I and 9E of the external casing is less than or equal to 3 mm.

Figure 4:
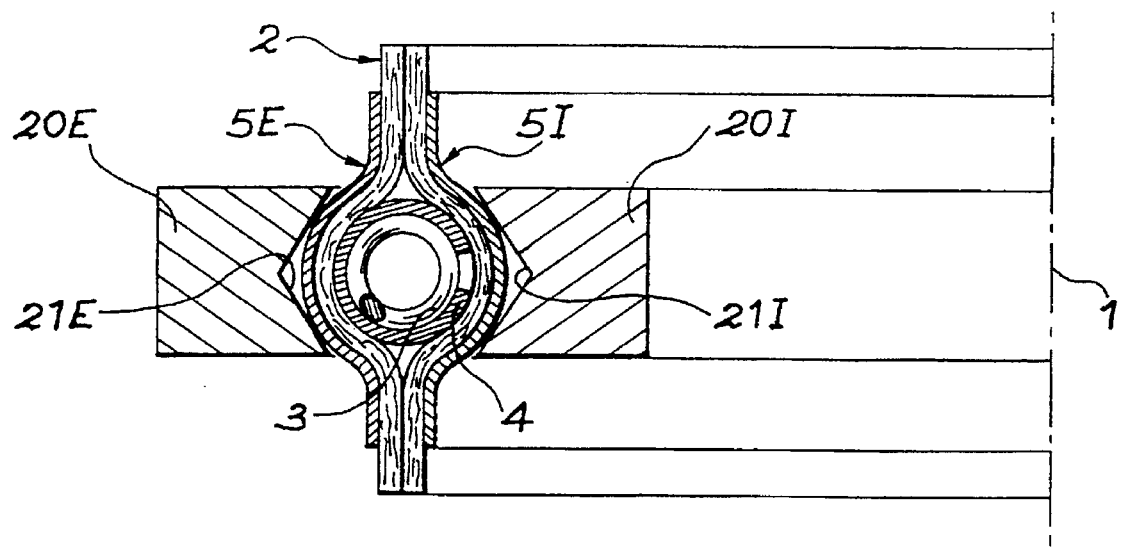
FIG. 4 is a sectional view of the gasket of the invention completed by two additional elements.

With reference to FIG. 4, in all these embodiments of the gasket of the invention, when said gasket has a bulged shape and in particular when it is large, it may be advantageous to use one or two metallic reinforcing pieces around the joint. This, an internal metallic reinforcing piece 20I formed of a ring having a V-shaped groove 21I on its outer surface is applied by the latter to the internal outer casing 5I of the gasket. Similarly, an outer metallic reinforcing piece 20E, formed of a ting and having a V-shaped groove 21E made to its inner surface, may be applied by the latter against the outer external rigid casing 5E.

It is also possible to use one of these reinforcing pieces independently of the other. These metallic reinforcement pieces 20I and 20E avoid any possible separation of the components of the gasket.

For certain embodiments, especially for large joints, it is advantageous to use the metallic reinforcing pieces described on FIG. 4.

It can be seen that with the gasket of the invention, despite certain difficulties in mounting and accessibility and imperfections concerning the evennness of surfaces where imperviousness is to be effected, a static imperviousness can be obtained, that is between two parts fixed with respect to each other, by crushing the two flexible extremities of the gasket.

What is claimed is:

1. A toric ultraflexible gasket intended to ensure imperviousness between two mediums where different temperatures prevail, these two mediums being delimited by two walls separated by a space, said gasket comprising:

a ring-shaped flexible strip with a determined width larger than the width of said space;

a ring-shaped internal casing within a central portion of said flexible strip; and a rigid external casing surrounding said central portion of said flexible strip such that end portions of said flexible strip form two impervious extremities which are radially deformed in the space, wherein the flexible strip is formed of inner and outer elements, said inner element located at a radially inner side of said internal casing and said outer element located at a radially outer side of said internal casing, said inner and outer elements each having a bulged central portion to surround said internal casing and end portions to constitute the two impervious extremities of the flexible strip.

2. The gasket according to claim 1, wherein said internal casing includes a ductile metallic core.

3. The gasket according to claim 2, wherein said metallic core is a spring.

4. The gasket according to claim 2, wherein said internal casing includes a rigid metallic casing around said ductile metallic core.

5. The gasket according to claim 1, wherein said rigid external casing is formed of inner and outer members, said inner member located at a radially inner side of said flexible strip and said outer element located at a radially outer side of said flexible strip, said inner and outer members each having a bulged central portion and engaging a corresponding element of the flexible strip.

6. The gasket according to claim 2, wherein said internal casing is in the form of a ductile solid retainer ring.

7. The gasket according to claim 1, further comprising at least one of an outer metallic reinforcing piece engaging a radial outside surface of the rigid external casing and an inner metallic reinforcing piece engaging a radial inside surface of the rigid external casing.

8. A joint between two mediums where different temperatures prevail, said joint comprising:

- a first fixed part centered about a longitudinal axis and having a longitudinally facing first surface;
- a second fixed part centered about said longitudinal axis and having a longitudinally facing second surface, said second surface facing said first surface and longitudinally separated by a space; and
- a toric ultraflexible gasket including a generally ring-shaped flexible strip centered about said longitudinal axis and having a longitudinal length larger than the longitudinal length of said space, said flexible strip being formed by separate inner and outer elements, said inner element located radially inside said outer element, a ring-shaped internal casing at a central portion of said flexible strip and between said inner and outer elements, and a rigid external casing surrounding said central portion of said flexible strip such that end portions of said flexible strip form first and second impervious extremities, said first impervious extremity engaging said first surface and radially deformed thereby and said second impervious extremity engaging said second surface and radially deformed thereby.

9. The joint according to claim 8, wherein said inner and outer elements of at least one of said first and second impervious extremities are deformed in the same radial direction.

10. The joint according to claim 9, wherein said inner and outer elements of at least one of said first and second impervious extremities are deformed in opposite radial directions.

11. The joint according to claim 8, wherein said second part forms a housing open only at a longitudinal end facing said first surface and said gasket is located within said housing.

12. The joint according to claim 8, wherein said internal casing includes a ductile metallic core.

13. The joint according to claim 12, wherein said metallic core is a spring.

14. The joint according to claim 12, wherein said internal casing includes a rigid metallic casing around said ductile metallic core.

15. The joint according to claim 8, wherein said rigid external casing is formed of inner and outer members, said inner member located at a radially inner side of said flexible strip and said outer element located at a radially outer side of said flexible strip, said inner and outer members each having a bulged central portion and engaging a corresponding element of the flexible strip.

16. The joint according to claim 8, wherein said internal casing is in the form of a ductile solid retainer ring.

17. The joint according to claim 8, further comprising at least one of an outer metallic reinforcing piece engaging a radial outside surface of said rigid external casing and an inner metallic reinforcing piece engaging a radial inside surface of said rigid external casing.

* * * * *